US009811440B2

(12) United States Patent
Chacko et al.

(10) Patent No.: US 9,811,440 B2
(45) Date of Patent: Nov. 7, 2017

(54) SYSTEM AND METHOD FOR ADDRESSING MALFUNCTIONS IN A SOFTWARE APPLICATION

(71) Applicant: HCL Technologies Limited, Noida, Uttar Pradesh (IN)

(72) Inventors: Simy Chacko, Andhra Pradesh (IN); Suresh Naidu Ponakala, Andhra Pradesh (IN); S U M Prasad Dhanyamraju, Andhra Pradesh (IN); Shiva Sholayappan, Andhra Pradesh (IN)

(73) Assignee: HCL Technologies LTD., Nolda (IN)

( * ) Notice: Subject to any disclaimer, the term of this patent is extended or adjusted under 35 U.S.C. 154(b) by 0 days.

(21) Appl. No.: 15/065,237

(22) Filed: Mar. 9, 2016

(65) Prior Publication Data

US 2016/0321157 A1 Nov. 3, 2016

(30) Foreign Application Priority Data

Apr. 28, 2015 (IN) ............................ 1177/DEL/2015

(51) Int. Cl.
*G06F 11/36* (2006.01)
*G06F 9/44* (2006.01)

(52) U.S. Cl.
CPC ................... *G06F 11/362* (2013.01)

(58) Field of Classification Search
CPC .................................................. G06F 11/362
USPC ......................................................... 717/127
See application file for complete search history.

(56) References Cited

U.S. PATENT DOCUMENTS

| 7,478,367 | B2 | 1/2009 | Morgan et al. |
| 8,489,931 | B2 | 7/2013 | Keromytis et al. |
| 8,601,322 | B2 | 12/2013 | Stolfo et al. |
| 9,021,428 | B2 | 4/2015 | Ajith Kumar et al. |
| 2003/0225866 | A1* | 12/2003 | Hudson .................. G06F 17/21 709/221 |
| 2008/0120350 | A1* | 5/2008 | Grabowski ....... G06F 17/30067 707/999.202 |

(Continued)

OTHER PUBLICATIONS

Goues et al., "Current challenges in automatic software repair", Springer, 2013, 23pg.*

(Continued)

*Primary Examiner* — Ryan Coyer
(74) *Attorney, Agent, or Firm* — Shumaker, Loop & Kendrick, LLP

(57) ABSTRACT

Systems and methods for resolving a bug identified in a software application without use of patch release or major release. A bug report is received from a target platform, wherein the bug report stores information associated with the bug identified in the software application. The software application is analyzed to identify a component associated with the bug. A set of rules and a set of actions pertaining to the component are generated, wherein the set of rules are configured to monitor parameters associated to the component, and wherein the set of actions are configured to resolve the bug identified in the component. A new binary snippet corresponding to the component is generated based on the set of rules and the set of actions. The new binary snippet is injected into the application binary code in order to resolve the bug in the software application.

17 Claims, 3 Drawing Sheets

(56) References Cited

U.S. PATENT DOCUMENTS

2012/0124410 A1* 5/2012 Chun ............... G06F 11/0793
714/2
2014/0372805 A1* 12/2014 Rijnders ............ G06F 11/0793
714/37

OTHER PUBLICATIONS

Nguyen et al., "SemFix: Program Repair via Semantic Analysis", IEEE, 2013, 10pg.*
Sidiroglou et al., "ASSURE: Automatic Software Self-healing Using REscue points", ACM, 2009, 12pg.*
Wei et al., "Automated Fixing of Programs with Contracts", ACM, 2010, 12pg.*
Tanim Hasan et al.: A Case-Based Framework for Self-Healing Paralysed Components in Distributed Software Applications, ResearchGate; Conference Paper—Dec. 2014, 8 pages.

* cited by examiner

SYSTEM AND METHOD FOR ADDRESSING MALFUNCTIONS IN A SOFTWARE APPLICATION

CROSS-REFERENCE TO RELATED APPLICATIONS AND PRIORITY

The present application claims benefit from Indian Complete Patent Application No. 1177/DEL/2015, filed on Apr. 28, 2015, the entirety of which is hereby incorporated by reference.

TECHNICAL FIELD

The present disclosure in general relates to the field of software testing. More particularly, the present invention relates to a system and method for testing and resolving malfunctions in a software application.

BACKGROUND

Software defects can be an error, flaw, failure, or fault in a software program that causes the software program to behave in unintended ways or produce an incorrect or unexpected result. Many of these software defects occur due to the mistakes and errors made by a developer in source code, design, tools used to develop the software program, or issues with the framework used to develop the software program. In order to address the software defects, thorough testing is performed on the software program before releasing the software program/application to a customer/production at different stages. As per a recent survey in the field of software testing, it is observed that approximately 27% of defects get leaked to production in the case of information software, 10% of defects get leaked in the case of commercial software, and 7% of defects get leaked in the case of system software. In spite of strict quality process and software testing, nearly 40% of these defects/bugs are caused due to coding errors.

The cost of resolving a software defect is proportional to its severity and the time it takes for fixing the software defect. Typically, a software patch release or a major release is recommended to fix the software defect. However, the software patch release or the major release takes a month to a year on average to reach the customer.

The majority of the coding bugs/defects that exist today in software applications are directly or indirectly related to data validation. Malicious or invalidate data inputs to different modules/sub-modules in the software application lead to serious security, data corruption, or availability related issues. Many software applications perform entry level validation at user input modules to test standard entry points, but software applications have multiple entry points such as web services, SDKs, and Macros. The hacking attacks generally do not come through standard entry points, but from undocumented usage of modules, data read from corrupted files/registry/database and the like. Hence, the input validations performed at user-input in the testing cycle are not enough to protect the integrity of the software application. Most of the negative tests that are performed especially in blackbox testing are limited to default/known entry-points. Many error types such as division by zero, arithmetic overflow or underflow, Null pointer dereference, use of uninitialized variable, buffer overflow, wrong data type etc. can be prevented if data validations are performed at appropriate stages. Other major reasons for the defects are deadlock, race conditions, and heavy use of resources in multithreaded environment. These other performance issues are noticed because of improper utilization of resources, no proper timeouts, and mismatch in the response speed of the system on which the software application is installed.

Many application SDKs/web services are stateful, i.e. it expects an external application to invoke the methods in some specified order. Hence it is observed that applications are written with minimal validations at each stage, assuming that SDKs/web services would be invoked by trusted applications. Incorrect API usage is another major cause for software defects.

Considering the above problems in the art, it is very important to have checkpoints at different levels of the software application, wherein the checks are very specific to context. However, it is a time consuming process to have programmatic checks at multiple levels in the case of a new application, due to lots of coding and testing efforts. Also, it is difficult to address this kind of issue in software applications that are already deployed due to lots of rework. Also, throttling of data flow, or invoking Methods/functions/subroutines, controlling number of parallel processed/threads etc. is very much critical for software operations to make sure the availability and SLAs (in terms of response time) of certain services. Hence, there is a need to address many of the bugs at the production level and minimize the wait time caused due to patch releases.

SUMMARY

This summary is provided to introduce aspects related to systems and methods for addressing malfunctions associated with a software application and the aspects are further described below in the detailed description. This summary is not intended to identify essential features of the claimed subject matter nor is it intended for use in determining or limiting the scope of the claimed subject matter.

In one embodiment, a method for resolving a bug identified in a software application is illustrated. Initially a bug report is received from a target platform by a processor, wherein the bug report comprises information associated with the bug identified in the software application. In the next step, an application binary code associated with the software application is analyzed by the processor to identify a component associated with the bug, wherein the component indicates a part of the application binary code. Further, a set of rules and a set of actions pertaining to the component are generated by the processor, wherein the set of rules are configured to monitor one or more parameters associated to the component, wherein the parameters include a set of internal variables as well as an execution flow of the component, and wherein the set of actions are configured to resolve the bug identified in the component. In one embodiment, the set of rules and the set of actions may be generated based on the inputs received from a user, wherein the user may be an administrator, an architect, a technical manager, or a developer of the software application. Furthermore, a new binary snippet corresponding to the component is generated by the processor, based on the set of rules and the set of actions. Finally, the new binary snippet is injected into the application binary code by the processor in order to initiate at least one action, from the set of actions, to resolve the bug in the software application, wherein the at least one action is initiated based on the set of rules.

In one embodiment, a system for resolving a bug identified in a software application is illustrated. The system comprises a memory and a processor coupled to the memory, wherein the processor is configured to receive a bug report from a target platform, wherein the bug report comprises information associated with the bug identified in the software application. Further, the processor is configured to analyze an application binary code associated with the software application to identify a component associated with the bug, wherein the component indicates a part of the application binary code. Further, the processor is configured to generate a set of rules and a set of actions pertaining to the component, wherein the set of rules are configured to monitor one or more parameters associated to the component, wherein the parameters include a set of internal variables and execution flow of the component, and wherein the set of actions are configured to resolve the bug identified in the component. In one embodiment, the set of rules and the set of actions may be generated based on the inputs received from a user, wherein the user may be an administrator, an architect, a technical manager, or a developer of the software application. Further, the processor is configured to generate a new binary snippet corresponding to the component based on the set of rules and the set of actions. Furthermore, the processor is configured to inject the new binary snippet into the application binary code in order to initiate at least one action, from the set of actions, to resolve the bug in the software application, wherein the at least one action is initiated based on the set of rules.

In one embodiment, a computer program product having embodied computer program for resolving a bug identified in a software application is disclosed. The program comprises a program code for receiving a bug report from a target platform, wherein the bug report comprises information associated with the bug identified in the software application. Further, the program comprises a program code for analyzing an application binary code associated with the software application to identify a component associated with the bug, wherein the component indicates a part of the application binary code. Further, the program comprises a program code for generating a set of rules and a set of actions pertaining to the component, wherein the set of rules are configured to monitor one or more parameters associated to the component, wherein the parameters include a set of internal variables and execution flow of the component, and wherein the set of actions are configured to resolve the bug identified in the component. In one embodiment, the set of rules and the set of actions may be generated based on the inputs received from a user, wherein the user may be an administrator, an architect, a technical manager, or a developer of the software application. Further, the program comprises a program code for generating a new binary snippet corresponding to the component based on the set of rules and the set of actions. Furthermore, the program comprises a program code for injecting the new binary snippet into the application binary code in order to initiate at least one action, from the set of actions, to resolve the bug in the software application, wherein the at least one action is initiated based on the set of rules.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present disclosure relates to systems and methods for resolving at least one bug identified in a software application. The system comprises a memory and a processor coupled to the memory, wherein the processor is configured to receive a bug report from a target platform, wherein the software application is deployed over the target platform. In one embodiment, the bug report comprises information associated with the bug identified in the software application. Once, the bug report is accepted, the processor analyzes an application binary code associated with the software application to identify a component associated with the bug, wherein the component indicates a part of the application binary code. The Application binary code referred here is nothing but an excitable in the form of an Exe, a jar, a War, or any other software package that contains Machine-language code or byte code in case of Java and Common Intermediate Language (CIL) in case of .net or any other equivalent.

Once the component is identified, in the next step, the processor generates a set of rules and a set of actions pertaining to the component. In one embodiment, the set of rules are configured to monitor one or more parameters associated to the component and the set of actions are configured to resolve the bug identified in the component. Further, the processor is configured to generate a new binary snippet corresponding to the component based on the set of rules and the set of actions. Further, the new binary snippet is injected into the application binary code in order to initiate at least one action, from the set of actions, in order to resolve the bug in the software application. The new binary snippet is a binary equivalent of assembly/byte code that is generated based on the set of rules and set of actions. In one embodiment, the at least one action is initiated based on the set of rules in the new binary snippet.

While aspects of described system and method for resolving at least one bug identified in a software application may be implemented in any number of different computing systems, environments, and/or configurations, the embodiments are described in the context of the following exemplary system.

Figure 1:
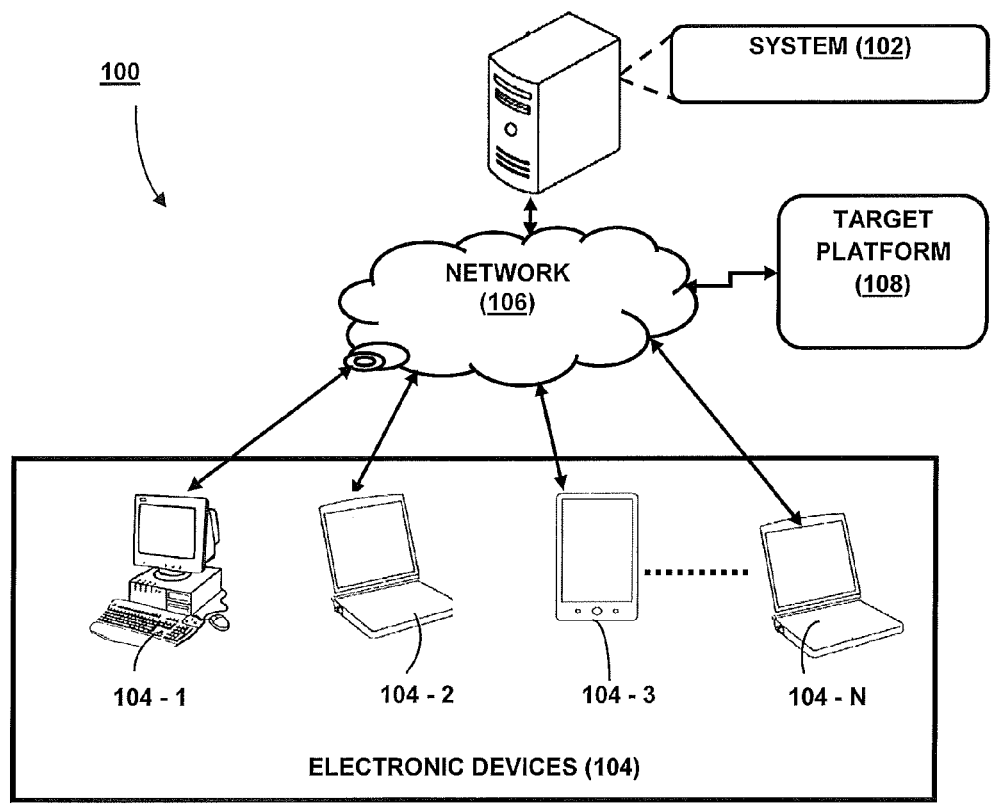
FIG. 1 illustrates a network implementation of a system for resolving a bug identified in a software application, in accordance with an embodiment of the present subject matter.

Referring now to FIG. 1, a network implementation 100 of a system 102 to resolve at least one bug identified in a software application is disclosed, wherein the software application is developed over a target platform 108. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. Furthermore, the system 102 may be communicatively coupled with a target platform 108 using the network 106. Alternatively, the system 102 may be directly connected to the target platform 108 using a communication link. The target platform 108 is enabled deploy the software application. The target platform 108 may be equipped with automated tools to identify bugs in the software application. These bugs may be related to security, functionality, or performance issues in the software application. Further, the third part platform may also gather information associated with the bugs. This information may include a nature of bug, a complexity of bug, and a priority of bug, based on the requirements specified by the user of the target platform 108. Once this information is gathered, the target platform 108 may generate a bug report, wherein the bug report stores information associated with all the bugs identified from the software application. Alternately, the bugs may be identified manually and the bug report may be generated manually by a user of the target platform 108. Once the bug report is generated, the target platform is configured to transfer the bug report to the system 102. The process of analyzing the bug report and the software application by the system 102 is further explained with respect to the FIG. 2.

Figure 2:
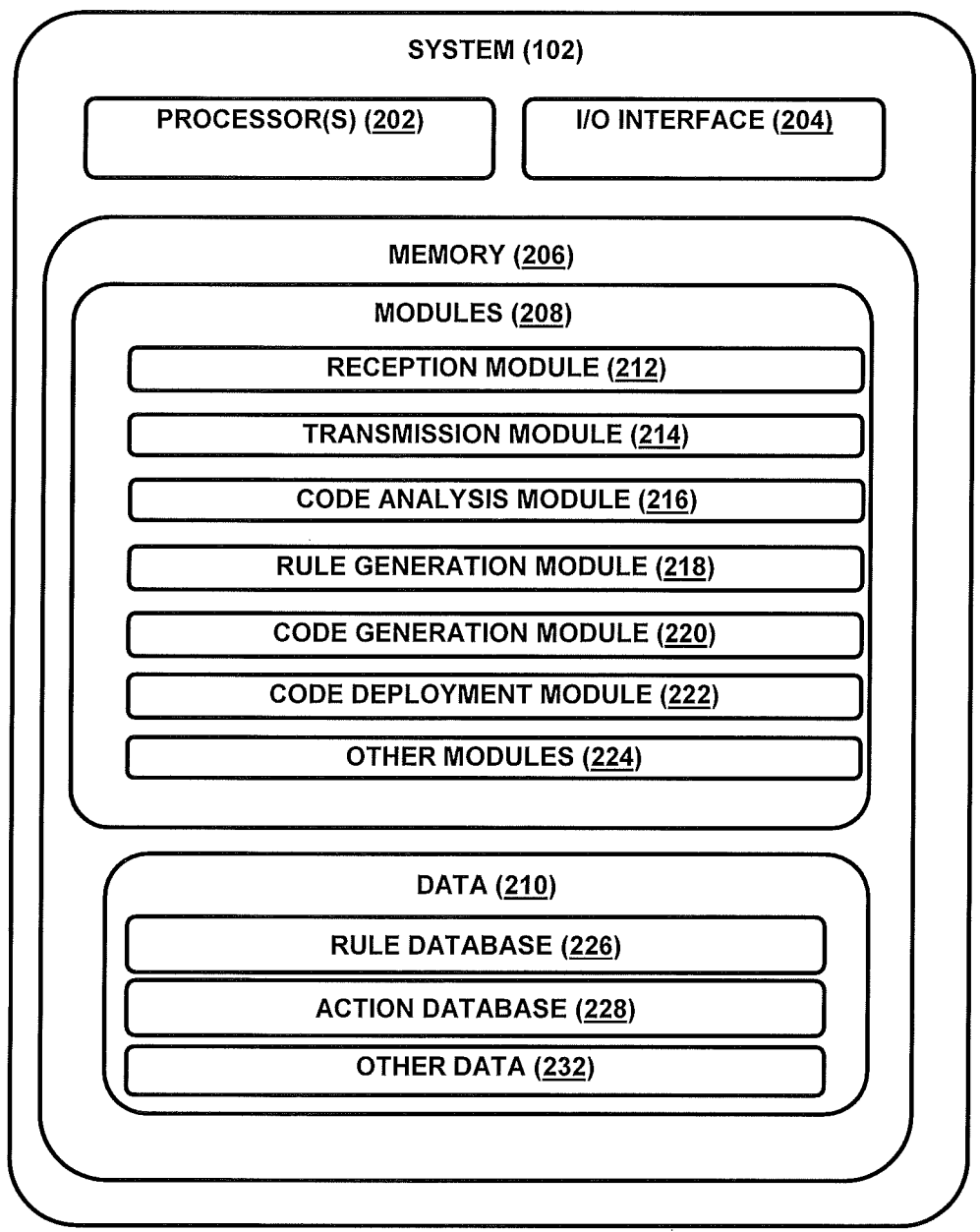
FIG. 2 illustrates the system for resolving the bug identified in the software application, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a reception module 212, a transmission module 214, a code analysis module 216, a rule generation module 218, a code generation module 220, a code deployment module 222, and other modules 224. The other modules 224 may include programs or coded instructions that supplement applications and functions of the system 102.

The data 210, amongst other things, serves as a repository for storing data processed, received, and generated by one or more of the modules 208. The data 210 may also include a rule database 226, and action database 228, and other data 232. The rule database 226 is configured to store rules for monitoring the software application and the action database 228 is configured to store actions to be performed based on the bugs that are identified from the software application. In one embodiment, the other data 232 may include data generated as a result of the execution of one or more modules in the other module 224. Further, the software application may be selected in the form of a software program hosted over a client server system, or a web service system. Further, the software application may be in the form of a hosted application, enterprise software, or any software program hosted on internet as they are more vulnerable to security attacks.

In one implementation, at first, a user may use the client device 104 to access the system 102 via the I/O interface 204. The user may register using the I/O interface 204 in order to use the system 102. In one embodiment, once the user registers to the system 102, the user may send the bug report received from the target platform 108 as input to the system 102, wherein the bug report is configured to store information associated with the bug identified from the software application. Alternately, the target platform 102 may sent the bug report to the system 102, wherein the system 102 accepts the bug report using the reception module 212 and notifies the user when the bug report is received. The bug report is configured to store information associated with at least one bug identified in the software application. This information associated with the bug may include includes a nature, a complexity, and a priority of the bug. The nature of the bug may be classified as security bug, functionality bug, performance bug, or a malfunction in the software application and the like.

Once the bug report is accepted by the system 102, in the next step, the code analysis module 216 is configured to analyse an application binary code associated with the software application based on the information associated with the bug to identify a component associated with the bug. The component indicates a part of the application binary code that is responsible for the generation of bug in the software application. The component may be in the form of a module, a unit, a functional parameter, a design parameter, a declaration, or any other part of the application binary code. In one embodiment, the application binary code may be extracted from an exe file, a jar file, a war file, or a software package associated with the software application.

Further, once the component is identified, the rule generation module 218 is configured to generate a set of rules and a set of actions based on the component identified from the application binary code. Alternately, the set of rules and the set of actions may be generated based on the inputs received from the user of the system 102 such as an administrator, an architect, a technical manager, or a developer of the software application. In one embodiment, each rule from the set of rules corresponds to at least one action from the set of actions. The set of rules are configured to monitor one or more parameters associated to the component. In one embodiment, the parameters associated with the component may include a set of internal variables and/or execution flow associated with the component. The set of internal variables associated with the component may include a global/static variables, Local variables (that persist within a method/block), or volatile type of variables used for storing data temporarily in the memory/registry for/during processing. Further, the set of rules are configured to perform a set of checks over the component to monitor the set of internal variables and the execution flow associated with the component. Further, each action from the set of actions corresponds to a solution that can be adapted in order to resolve the bug identified in the software application. For example, a rule from the set of rules may be configured to check whether a number of parallel registrations handled by a registration component are more than hundred. The corresponding action for this rule may be in the form of rejecting all the requests that exceed the first hundred registrations. In one embodiment, the set of rules and the set of actions can be manually configured by the user of the system 102 in the form of a policy document. Further, the set of rules and the set of action may be stored in the rule database 226 and action database 228 respectively. The rule database 226 and the action database 228 may be configurable based on the inputs received from the user in order to change the set of rules and the set of actions associated therewith and set new rules and action or edit the existing rules.

Further, the code generation module 220 is configured to generate a new binary snippet for monitoring the component based on the set of rules and the set of actions. The new binary snippet is in the form of conditional statements generated from the set of rules to monitor the parameters associated with the component and initiate at least one action from the set of actions to address the bug. Once the new binary snippet is generated, the code deployment module 222 is configured to inject the new binary snippet into the application binary code. Once the new binary snippet is injected, the software application is rebooted to make the new binary snippet effective in the software application. Since the new binary snippet is generated at the binary coding level, the changes are effective as soon as the software application is rebooted. Once the software application is rebooted, the new binary snippet monitors the component based on at least one rule selected from the set of rules and initiates at least one action, corresponding to the rule, from the set of actions to resolve the bug in the software application. In one embodiment, there may exist multiple instances of the component in the application binary code. In order to address bug at multiple instances of the component, the new binary snippet is injected a teach instance of the component to address the bug at all the instances. In one example, if an initialization or assignment statement is identified with variable values definition. In this case, a new binary snippet corresponding to a rule and action, to address variable values, is inserted into the application binary code. The new binary snippet is injected at multiple instances, based on the rule selected from the set of rules. The process of addressing the bugs identified in the software application is further explained with respect to the flowchart of FIG. 3.

Figure 3:
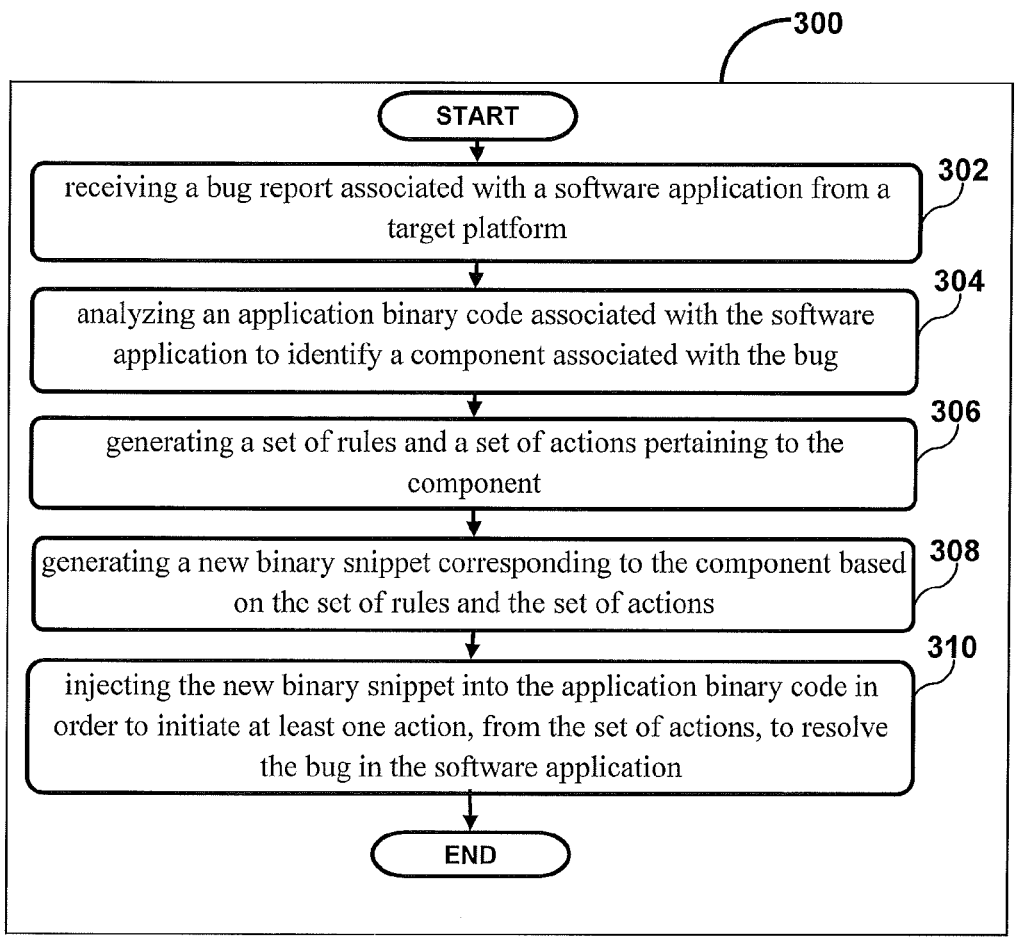
FIG. 3 illustrates a block diagram for resolving the bug identified in the software application, in accordance with an embodiment of the present subject matter.

FIG. 3 represent a block diagram to resolve at least one bug identified or suspected in a software application. At block 302, the reception module 212 is configured to receive the bug report associated with the software application from the target platform 108. Alternately, the reception module 212 may also be configured to receive the bug report from the user through the I/O interface 204. The bug report stores information associated with the bug, wherein the bug is identified from the software application. In one embodiment, more than one bug may be identified from the software application and information associated with the bugs may be stored in the bug report. Each of the bug reported in the bug report is analyzed and resolved in a similar manner as described in the below steps.

At block 304, the code analysis module 216 is configured to analyse the application binary code associated with the software application based on the information associated with the bug to identify a component associated with the bug. The component indicates a part of the application binary code that is responsible for the generation of bug in the software application. In one embodiment, the application binary code associated with the software application may be extracted from an exe file, a jar file, a war file, or a software package associated with the software application.

At block 306, the rule generation module 218 is configured to generate a set of rules and a set of actions based on the component identified from the application binary code. In one embodiment, each rule from the set of rules corresponds to at least one action from the set of actions. The set of rules are configured to monitor one or more parameters associated to the component and each action from the set of actions corresponds to a solution that may be adapted in order to resolve the bug identified in the software application. In one embodiment, the parameters associated with component include the set of internal variables and the execution flow of the component. Further, the rule database 226 and the action database 228 may be configurable based on the inputs received from the user in order to change the set of rules and the set of actions associated therewith and set new rules and action or edit the existing rules.

At block 308, the code generation module 220 is configured to generate the new binary snippet for monitoring the component based on the set of rules and the set of actions. The new binary snippet is generated in the form of conditional statements from the set of rules, wherein the set of conditional statements are configured to monitor the parameters associated with the component and initiate at least one action from the set of actions to address the bug.

Finally, at block 310, the code deployment module 222 is configured to inject the new binary snippet into the application binary code associated with the software application. Once the new binary snippet is injected, the software application is rebooted to make the new binary snippet effective in the software application. Since the new binary snippet is generated at the binary coding level, the changes are effective as soon as the software application is rebooted. Once the software application is rebooted, the new binary snippet monitors the component based on at least one rule selected from the set of rules and initiates at least one action, corresponding to the rule, from the set of actions to resolve the bug in the software application.

In one example, the bug report may be transmitted to the system 102 from the target platform 108. This big report may contain information of bugs associated with data validation. For example, the bug report may summarize data validation bugs associated with the object "email". In such a case, the system 102 may analyze bug report and application binary code of the software application to identify the component in which the object email is declared. Once the component is identified, the system 102 accepts a set of rules and a set of actions from the user of the system 102. Further, the system 102 may utilize the set of rules and the set of actions to generate a new binary snippet(<rule name="checkemail"Type="declaration"class="com.hcl.xyz "vamame="email"regexCheck=÷\b[A-Z0-9._%+−]+@[A-Z0-9.−]+\[A-Z]{2,4} \b"action="Exception" message="invalid email">). The new binary snippet is injected into the component and the software application is restarted. Once the software application is restarted, a check will be performed in the software application and wherever there is an assignation to variable "email", a message "invalid email" will be popped up based on the set of rules and the set of actions in the new binary snippet.

In a similar manner, a new binary snippet (<rule name="check date" type="declaration" class="com.hcl.xyz" varname="date" codeEvalCheck="date>currentDate" action="Exception" message="invalid Date">), may be generated and inserted after an assignation to variable "date" into the software application and will display the message "invalid date" as an when the execution reaches the declaration of "date". Further, a new binary snippet (<rule name="check object" type="declaration" class="com.hcl.xyz" vamame="point" notNullCheck="true" replace="new Point(0,0)">) may be generated to check for every assignation of variable "point" and will replace the value with 0, if it's null. Further, a new binary snippet (<rule name="check string" type="declaration" class="com.hcl.xyz" varname="userid" notNullCheck="true" replace=" ">) may be generated to check for every assignation and will replace with empty (" "), if it is null.

The process for Data validation as discussed can be used to perform the following checks using the set of rules:
1. Range check
2. Wildcards check
3. Length check
4. Regular expression check
5. A simple/complex comparison with other variable accessible within a block of code
6. Basic checks like 'NOT NULL'
7. A custom code block that returns true or false.

To address the above data validation issues the below action can be taken using the set of actions:
1. Throw an exception
2. Replace the value with a constant
3. Replace the value with a code block/expression
4. Log a message/value In one example, in order to address bugs related to function definition including class-constructor, the system 102 may be configured to generate checks to be performed before any function call, in the form of new binary snippet. For example, a new binary snippet (<rule name="save user" type="FuncDef" subtype="throttlingCall" class="com.hcl.xyz" method="saveUser" max="10" timeframe="minute" action="abortthread">) may be generated to limit 10 calls for time frame of one minute. Further, a new binary snippet (<rule name="save user" type="FuncDef" subtype="timeOutCheck" class="com.hcl.xyz" method="saveUser" max="1" unit="minute" action="abortthread">) may be generated to timeout the call, if execution-time reaches one minute. Further, a new binary snippet (<rule name="save user" type="FuncDef" subtype="maxParallelCheck" class="com.hcl.xyz" method="saveUser" max="5" action="wait">) may be generated to allow only 5 parallel calls. Further, a new binary snippet (<rule name="save user" type="FuncDef" subtype="CatchExceptionCheck" exceptionName="IOErrorException" class="com.hcl.xyz" method="saveUser" max="5" action="ExceptionIgnore">) may be generated to handle any "IOErrorException." In one embodiment, the set of rules associated with the function definition may be as follows:
1. Maximum number of calls allowed in unit time
2. Maximum number parallel executions in different threads
3. Timeout
4. Catching an unhandled exception Further, the set of actions associated with the function definition may include:
1. Abort the application
2. Abort the thread
3. Return from function with constant
4. Return from function with a value expression (code block)
5. Throw an exception
6. Do nothing (Ex: when we catch exception)
7. Log a message In one example, the new binary snippet may be generated for any specific statement in the application binary code such as how new values are different from old values?, how many times a function is called in 'n' seconds?. For this purpose, a new binary snippet (<rule name="save user" type="lcheck" subtype="throttlingExecution" class="com.hcl.xyz" method="saveUser" lineNumber="5" max="10" timeframe="minute" action="wait">) may be generated to wait at line number 5 of a SaveUser code, till number of parallel threads running in parallel come down to 10 or less. Further, a new binary snippet (<rule name="save user" type="lcheck" type="TimeoutExecution" class="com.hcl.xyz" method="saveUser" lineNumber-Start="5" lineNumberLine="15" max="1" unit="minute" action="abortthread">) may be generated to limit threads invoke calls between specific statements. The different types of rules performed to address any specific statement are as follows:
1. Maximum number of execution in unit time
2. Maximum number parallel threads
3. Timeout between two executions points (line number)

In order to address any specific statement the following actions can be taken:
1. Abort the application
2. Abort the thread
3. Execute a specified code block
4. Throw an exception
5. Log a message In one embodiment, a policy manager may allow a user to set the rules in the form of a policy document through the I/O interface 204. Policy manager may validate the set of rules against the application binary code of the software application. The system 102 is configured to convert each policy to small code in the form of 'new byte code' or 'managed code' or 'machine code' or other compatible code hereafter referred to as "new binary snippet", based on the base technology used to develop the software application, and inject the new binary snippet to right locations in the application binary code to monitor and take preventive actions.

In one embodiment, the system 102 is configured to addresses performance, security, data corruption, crash issues as quickly as possible. The system 102 also reduces the Mean Time To Repair (MTTR) and improves customer satisfaction since the issues/bugs are closed quickly. Further, the system 102 also improves the productivity and reduces coding efforts. Further, the system 102 also performs policy check based on the set of rules thus reducing the amount of code changes.

Although implementations of methods and systems for resolving bugs identified in a software application is disclosed, it is to be understood that the appended claims are not necessarily limited to the specific features or methods described herein. Rather, the specific features and methods are disclosed as examples of implementations for resolving bugs identified in the software application.

We claim:

1. A method for resolving a bug identified in a software application, the method comprising steps of:
   receiving, by a processor, a bug report from a target platform, wherein the bug report comprises information associated with the bug identified in the software application;
   analyzing, by the processor, an application binary code associated with the software application to identify a component associated with the bug, wherein the component indicates a part of the application binary code;
   generating, by the processor, a set of rules and a set of actions pertaining to the component, wherein the set of rules are configured to monitor one or more parameters associated to the component, wherein the parameters include a set of internal variables and execution flow of the component, and wherein the set of actions are configured to resolve the bug identified in the component, and wherein the component is monitored based on at least one rule selected from the set of rules, and wherein the rule is selected based on the information associated with the bug;
   generating, by the processor, a new binary snippet corresponding to the component based on the set of rules and the set of actions; and
   injecting, by the processor, the new binary snippet into the application binary code in order to initiate at least one action, from the set of actions, to resolve the bug in the software application, wherein the at least one action is initiated based on the set of rules.

2. The method of claim 1, wherein the software application is installed over the target platform.

3. The method of claim 1, wherein the information associated with the bug includes a nature of the bug, a complexity of the bug, and a priority of the bug.

4. The method of claim 3, the nature of the bug is selected from a group of security bugs, functionality bugs, performance bugs or a malfunction in the software application.

5. The method of claim 1, wherein the application binary code is selected from an exe file, a jar file, a war file, or a software package associated with the software application.

6. The method of claim 1, wherein the set of rules includes a set of checks to be performed over the component to monitor the set of internal variables or the execution flow of the component.

7. The method of claim 1, wherein the new binary snippet is injected into the application binary code, at multiple instances, based on a rule selected from the set of rules.

8. The method of claim 1, wherein the set of rules and the set of actions are generated in an Extensible Markup Language (XML) file.

9. A system for resolving a bug identified in a software application, the system comprising:
   a memory;
   a processor couplet to the memory, wherein the processor is configured to perform the steps of:
      receiving a bug report from a target platform, wherein the bug report comprises information associated with the bug identified in the software application;
      analyzing an application binary code associated with the software application to identify a component associated with the bug, wherein the component indicates a part of the application binary code;
      generating a set of rules and a set of actions pertaining to the component, wherein the set of rules are configured to monitor one or more parameters associated to the component, wherein the parameters include a set of internal variables and execution flow of the component, and wherein the set of actions are configured to resolve the bug identified in the component, and wherein the component is monitored based on at least one rule selected from the set of rules, and wherein the rule is selected based on the information associated with the bug;
      generating a new binary snippet corresponding to the component based on the set of rules and the set of actions; and
      injecting the new binary snippet into the application binary code in order to initiate at least one action, from the set of actions, to resolve the bug in the software application, wherein the at least one action is initiated based on the set of rules.

10. The system of claim 9, wherein the software application is installed over the target platform.

11. The system of claim 9, wherein the information associated with the bug includes a nature of the bug, a complexity of the bug, and a priority of the bug.

12. The system of claim 11, the nature of the bug is selected from a group of security bugs, functionality bugs, performance bugs or a malfunction in the software application.

13. The system of claim 9, wherein the application binary code is selected from an exe file, a jar file, a war file, or a software package associated with the software application.

14. The system of claim 9, wherein the set of rules includes a set of checks to be performed over the component to monitor the set of internal variables or the execution flow of the component.

15. The system of claim 9, wherein the new binary snippet is injected into the application binary code, at multiple instances, based on a rule selected from the set of rules.

16. The system of claim 9, wherein the set of rules and the set of actions are generated in an Extensible Markup Language (XML) file.

17. A computer program product comprising a non-transitory computer-readable medium having embodied thereon a computer program for resolving a bug identified in a software application, the computer program product comprising:
   a program code for receiving a bug report from a target platform, wherein the bug report comprises information associated with the bug identified in the software application;
   a program code for analyzing an application binary code associated with the software application to identify a component associated with the bug, wherein the component indicates a part of the application binary code;
a program code for generating a set of rules and a set of actions pertaining to the component, wherein the set of rules are configured to monitor one or more parameters associated to the component, wherein the parameters include a set of internal variables and execution flow of the component, and wherein the set of actions are configured to resolve the bug identified in the component, and wherein the component is monitored based on at least one rule selected from the set of rules, and wherein the rule is selected based on the information associated with the bug;
a program code for generating a new binary snippet corresponding to the component based on the set of rules and the set of actions; and
a program code for injecting the new binary snippet into the application binary code in order to initiate at least one action, from the set of actions, to resolve the bug in the software application, wherein the at least one action is initiated based on the set of rules.

* * * * *